US012410102B2

(12) United States Patent
Momma et al.

(10) Patent No.: US 12,410,102 B2
(45) Date of Patent: Sep. 9, 2025

(54) CBN SINTERED BODY AND CUTTING TOOL

(71) Applicant: MITSUBISHI MATERIALS CORPORATION, Tokyo (JP)

(72) Inventors: Masashi Momma, Tokyo (JP); Shiro Oguchi, Tokyo (JP); Ryota Takei, Yashio (JP); Kenji Yumoto, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 976 days.

(21) Appl. No.: 17/433,275

(22) PCT Filed: Feb. 27, 2020

(86) PCT No.: PCT/JP2020/007904
§ 371 (c)(1),
(2) Date: Aug. 24, 2021

(87) PCT Pub. No.: WO2020/175598
PCT Pub. Date: Sep. 3, 2020

(65) Prior Publication Data
US 2022/0144709 A1 May 12, 2022

(30) Foreign Application Priority Data
Feb. 27, 2019 (JP) ................. 2019-034794

(51) Int. Cl.
C04B 35/5831 (2006.01)
B23B 27/14 (2006.01)
(52) U.S. Cl.
CPC ........ C04B 35/5831 (2013.01); B23B 27/148 (2013.01); B23B 2226/125 (2013.01);
(Continued)

(58) Field of Classification Search
CPC ........ C04B 35/5831; C04B 2235/3843; C04B 2235/3856; C04B 2235/386;
(Continued)

(56) References Cited

U.S. PATENT DOCUMENTS

2013/0000213 A1* 1/2013 Okamura ................ C04B 35/64
51/307
2013/0108850 A1 5/2013 Kudo et al.
(Continued)

FOREIGN PATENT DOCUMENTS

CN 102190497 A 9/2011
CN 104942555 A 9/2015
(Continued)

OTHER PUBLICATIONS

Supplementary European Search Report mailed Sep. 19, 2022, issued for European Patent Application No. 20762457.8.
(Continued)

Primary Examiner — Amber R Orlando
Assistant Examiner — Cameron K Miller
(74) Attorney, Agent, or Firm — Troutman Pepper Locke LLP; James E. Armstrong, IV; Nicholas J. DiCeglie, Jr.

(57) ABSTRACT

A cBN-based ultra-high pressure sintered body contains cBN particles and a binder phase. The binder phase contains at least one of a nitride or oxide of Al or a nitride, carbide, or carbonitride of Ti, and a metal boride having an average particle diameter of 20 to 300 nm is dispersed in an amount of 0.1 to 5.0 vol % in the binder phase. The metal boride includes a metal boride (B) containing at least one of Nb, Ta, Cr, Mo, and W as a metal component and containing no Ti and a metal boride (A) containing only Ti as a metal component. In a case where a ratio (vol %) of the metal boride (A) in the metal boride is represented by $V_a$ and a (Continued)

ratio (vol %) of the metal boride (B) is represented by $V_b$, a ratio of $V_b/V_a$ is 0.1 to 1.0.

5 Claims, 1 Drawing Sheet

(52) U.S. Cl.
CPC ............ *C04B 2235/3843* (2013.01); *C04B 2235/3856* (2013.01); *C04B 2235/386* (2013.01); *C04B 2235/3886* (2013.01); *C04B 2235/404* (2013.01)

(58) Field of Classification Search
CPC ...... C04B 2235/3886; C04B 2235/404; B23B 27/148; B23B 2226/125
See application file for complete search history.

(56) References Cited

U.S. PATENT DOCUMENTS

| | | |
|---|---|---|
| 2013/0309468 A1 | 11/2013 | Kudo |
| 2018/0257995 A1 | 9/2018 | Yano et al. |

FOREIGN PATENT DOCUMENTS

| | | |
|---|---|---|
| EP | 3578534 A1 | 12/2019 |
| JP | H03-131573 A | 6/1991 |
| JP | 4830571 B2 | 12/2011 |
| JP | 2014-083664 A | 5/2014 |
| JP | 6032409 B2 | 11/2016 |
| JP | 2018-145020 A | 9/2018 |
| WO | 2012/105710 A1 | 8/2012 |
| WO | 2019/087481 A1 | 5/2019 |

OTHER PUBLICATIONS

International Search Report mailed Apr. 28, 2020, issued for PCT/JP2020/007904 and English translation thereof.
Office Action mailed Apr. 26, 2022, issued for Chinese Application No. 202080015828.8 and a partial translation of Search Report.

\* cited by examiner

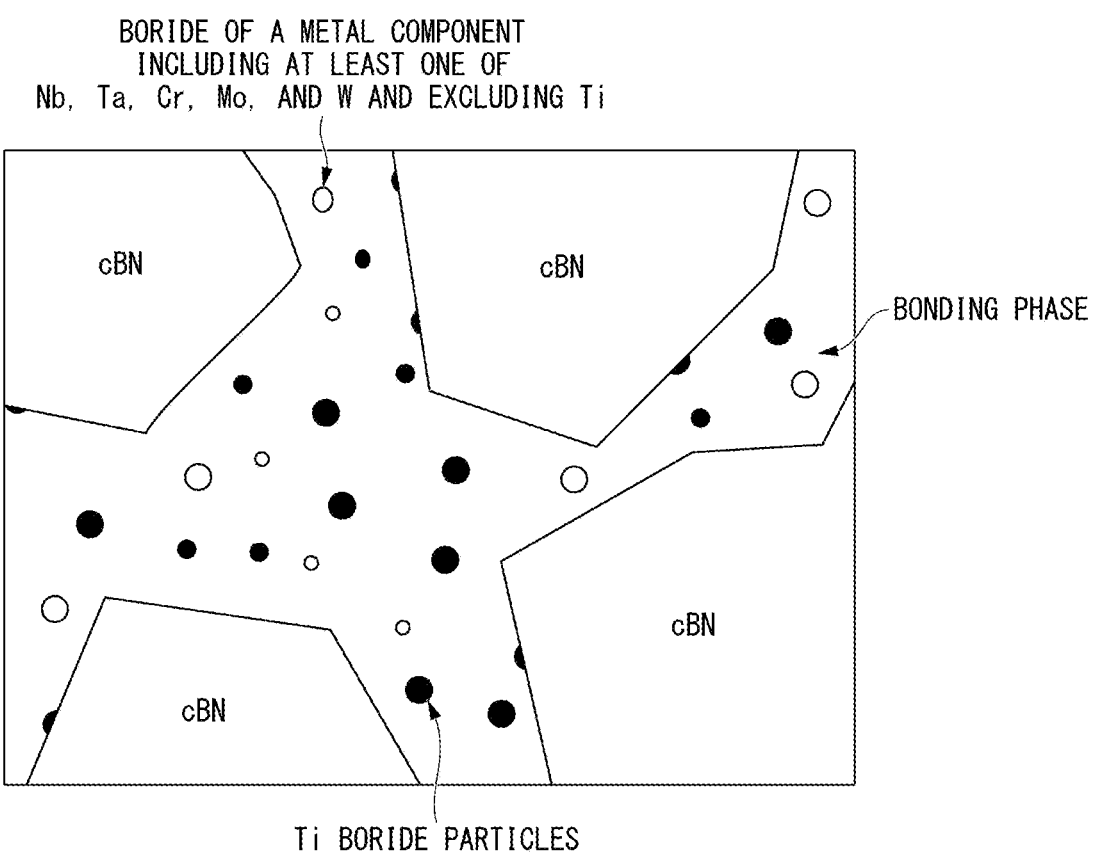

CBN SINTERED BODY AND CUTTING TOOL

TECHNICAL FIELD

The present invention relates to a cubic boron nitride (cBN)-based ultra-high pressure sintered body (hereinafter, referred to as "cBN sintered body") and a cutting tool having the cBN sintered body as a tool base (hereinafter, referred to as "CBN tool").

Priority is claimed on Japanese Patent Application No. 2019-034794, filed Feb. 27, 2019, the content of which is incorporated herein by reference.

BACKGROUND ART

A cBN sintered body has been known to have excellent toughness, widely used as a material for a cutting tool for an iron-based work material such as steel or cast iron, and improved in toughness by improving the structure of a binder phase.

Patent Document 1 describes a cBN sintered body in which a fine Ti boride phase having an average particle diameter of 50 to 500 nm and a fine W boride phase having an average particle diameter of 50 to 500 nm are dispersed and distributed in a binder phase, and toughness is improved by a dispersion strengthening effect of the binder phase.

Patent Document 2 describes a cBN sintered body in which a binder phase contains at least one composite compound of a composite nitride and a composite carbonitride containing at least one of V, Nb, and Ta and Ti as a metal component, an orthorhombic boride of at least one of V, Nb, and Ta, and AlN, and this leads to an increase in thermal stability and an improvement in toughness.

CITATION LIST

Patent Documents

[Patent Document 1]
  Japanese Patent No. 6032409
[Patent Document 2]
  Japanese Patent No. 4830571

SUMMARY OF INVENTION

Technical Problem

The toughness of a cBN sintered body is improved by the above techniques. However, the cBN sintered body has been required to have further improved toughness due to the increased cutting speed in recent years.

An object of the present invention is to provide a cBN sintered body having higher toughness and a CBN tool using the cBN sintered body as a tool base.

Solution to Problem

The inventors have conducted intensive studies on the bonding state between cBN particles and a binder phase, and found new knowledge that in a case where metal boride particles are dispersed in the binder phase, the reaction between the cBN particles and the binder phase in the sintered body is promoted, the bonding is strengthened, and thus the toughness of the cBN sintered body is improved.

The present invention is contrived based on the above knowledge, and includes the following aspects.

(1) A cBN-based ultra-high pressure sintered body according to an aspect of the present invention contains cBN particles and a binder phase, the binder phase contains at least one of a nitride or oxide of Al or a nitride, carbide, or carbonitride of Ti, and a metal boride having an average particle diameter of 20 to 300 nm is preferably dispersed in an amount of 0.1 to 5.0 vol %, more preferably 0.1 to 4.0 vol %, in the binder phase. The metal boride includes a metal boride (B) containing at least one of Nb, Ta, Cr, Mo, and W as a metal component and containing no Ti and a metal boride (A) containing only Ti. In the metal boride, in a case where a ratio (vol %) of the metal boride (A) containing only Ti as a metal component is represented by $V_a$ and a ratio (vol %) of the metal boride (B) containing at least one of Nb, Ta, Cr, Mo, and W as a metal component and containing no Ti is represented by $V_b$, a satisfactory range of a ratio of $V_b/V_a$ is 0.1 to 1.0. The ratio of $V_b/V_a$ is more preferably 0.2 to 0.8.

(2) Another aspect is the cBN-based ultra-high pressure sintered body according to (1), in which in a case where a maximum X-ray diffraction peak intensity of a {001} plane of a metal boride having a hexagonal structure in the metal boride (B) containing at least one of Nb, Ta, Cr, Mo, and W as a metal component and containing no Ti is represented by $I_{hex}$, and an X-ray diffraction peak intensity of a {111} plane of the cBN particles is represented by $I_{cBN}$, $0.04 \leq I_{hex}/I_{cBN} \leq 0.20$ is satisfied. $I_{hex}/I_{cBN}$ is more preferably 0.06 to 0.17.

(3) A further aspect is the cBN-based ultra-high pressure sintered body according to (1) or (2) in which a content ratio of the cBN particles is 40 to 80 vol %. In addition, assuming that a content ratio of all the cBN particles is 100 vol %, a content ratio of the cBN particles having an average particle diameter of less than 2 μm is 5 to 40 vol %, and a content ratio of the cBN particles having an average particle diameter of 2 μm or greater and less than 8 μm is 60 to 95 vol %.

(4) A still further aspect is a cutting tool including the cBN-based ultra-high pressure sintered body according to any one of (1) to (3). The cutting tool may have a tool body formed of the cBN-based ultra-high pressure sintered body and a cutting blade formed in the tool body. The cutting tool may be a cutting insert having an insert body formed of the cBN-based ultra-high pressure sintered body and a cutting blade formed in the insert body.

Advantageous Effects of Invention

A cBN-based ultra-high pressure sintered body according to the present invention has further improved toughness, and a cutting tool provided with the cBN-based ultra-high pressure sintered body exhibits excellent chipping resistance and chipping resistance.

BRIEF DESCRIPTION OF DRAWINGS

FIG. 1 is a schematic diagram showing a sintered structure of a cBN-based ultra-high pressure sintered body according to the present invention. The shape and size of each structure do not follow an actual sintered structure.

DESCRIPTION OF EMBODIMENTS

Hereinafter, a cBN sintered body according to the present invention and a cutting tool (CBN tool) having the cBN sintered body as a tool base will be described in greater detail. In the present specification and claims, a numerical range expressed using "to" includes numerical values of an upper limit and a lower limit thereof.

1. Binder Phase

A binder phase preferably contains at least one of a nitride or oxide of Al or a nitride, carbide, or carbonitride of Ti. As the nitride or oxide of Al or the nitride, carbide, or carbonitride of Ti, materials which have been known can be used.

2. Metal Boride Particles Dispersed in Binder Phase

Metal boride (which may be composite boride) particles of a predetermined size are dispersed at a predetermined ratio in the binder phase. The metal boride includes all atomic ratios which have been known, and is not necessarily limited to those in the stoichiometric range.

(1) Average Particle Diameter of Metal Boride Particles

Regarding the size of the metal boride particles dispersed in the binder phase, particles having an average particle diameter of 20 to 300 nm are dispersed in an amount of 0.1 to 5.0 vol %, more preferably 0.1 to 4.0 vol % with respect to the whole cBN sintered body. In a case where the average particle diameter of the metal boride particles is less than 20 nm, it is not possible to obtain a sufficient reaction promotion effect between the cBN particles and the binder phase, and in a case where the average particle diameter is greater than 300 nm, the metal boride becomes coarse, and this causes defects during cutting. In addition, in a case where the content ratio of the metal boride particles is less than 0.1 vol %, the metal boride amount is insufficient, and it is not possible to obtain a sufficient reaction promotion effect between the cBN particles and the binder phase, and in a case where the content ratio is greater than 5.0 vol %, the cBN sintered body has reduced hardness and toughness, and this causes defects during cutting. Even in a case where the content ratio of the metal boride particles is 3.0 to 5.0 vol %, in a case where the metal boride is dispersed as fine particles in the binder phase and the cBN sintered body is sufficiently sintered, the improvement of toughness by the dispersion of hard particles is exhibited, and the reduction in hardness and toughness is suppressed to be relatively small. Whereby, defects are less likely to be caused during cutting.

In order to obtain the average particle diameter of the metal boride, mapping images of the metal elements and the boron elements in a cross-sectional structure of the cBN sintered body are obtained using an Auger Electron Spectroscopy (hereinafter, referred to as AES) device, and sites where the metal element and the boron element overlap are extracted by image processing and specified as metal boride particles. Next, image analysis is performed on each of the specified particles to obtain the average particle diameter. Specifically, in order to clearly determine the metal boride particles in the binder phase, the mapping images of the metal elements and the boron elements in the same visual field, obtained using AES, are acquired in 256-gradation monochrome with 0 as black and 255 as white in which a site where no target element is present appears white and a site where a target element is present appears black, and binarization processing is performed so that a position where each element is present appears black in each monochrome image. In the mapping images of the metal elements and the boron elements in the same visual field, obtained by the binarization processing, the sites where the metal element and the boron element are present, that is, the sites which are black in both of the mapping images of the metal elements and the boron elements compared with each other are specified as metal boride particles.

Processing for separating parts where the metal boride particles are thought to be in contact with each other may be performed, for example, by using watershed as one image processing method. The separating processing may be performed on, for example, the image after extraction of the parts which are black in both of the mapping images of the metal elements and the boron element compared with each other.

First, the part corresponding to the metal boride particle (black part) in the image obtained after the binarization processing is subjected to particle analysis, and the maximum length obtained is defined as a diameter of each particle. As the particle analysis for obtaining the maximum length, the value of a larger one of the two lengths obtained by calculating the Feret's diameter for one metal boride particle is defined as the maximum length, and the value thereof is defined as the diameter of each particle. The volume obtained by calculation on the assumption that the particle is an ideal sphere having the above diameter is defined as the volume of each particle, and the cumulative volume is obtained. Based on the cumulative volume, a graph is drawn with the volume percentage [%] as a vertical axis and the diameter [μm] as a horizontal axis. Next, the diameter at which the volume percentage is 50% is defined as the average particle diameter of the metal boride particles, and an average of the average particle diameters obtained by performing the above processing on three observation regions is defined as the average particle diameter [μm] of the metal boride. In a case where the particle analysis is performed, the length (μm) per pixel is set using the scale value known in advance by a scanning electron microscope (SEM). Preferably, the observation region used in the image processing is, for example, a visual field region of 8.0 μm×8.0 μm.

(2) Metal Components of Metal Boride Particles

The metal boride particles preferably include a metal boride (B) (which may be a composite boride) containing at least one of Nb, Ta, Cr, Mo, and W as a metal component and containing no Ti and a metal boride (A) containing only Ti. In this case, since the reaction between the cBN particles and the binder phase is promoted, the bonding is strengthened, and the toughness of the cBN sintered body is improved.

(3) Metal Boride Particles Containing No Ti

In a case where the ratio (vol %) of the metal boride (A) containing only Ti as a metal component in the metal boride is represented by $V_a$ and the ratio (vol %) of the metal boride (B) containing at least one of Nb, Ta, Cr, Mo, and W as a metal component and containing no Ti is represented by $V_b$, a satisfactory range of a ratio of $V_b/V_a$ is preferably 0.1 to 1.0. In a case where the ratio of $V_b/V_a$ is less than 0.1, the amount of the metal boride (B) containing no Ti is insufficient, and thus it is not possible to obtain a sufficient reaction promotion effect between the cBN particles and the binder phase. On the other hand, in a case where the ratio of $V_b/V_a$ is greater than 1.0, the metal boride (B) containing no Ti is present in excess of the amount required to obtain the reaction promotion effect, and the cBN sintered body cannot obtain hardness and toughness.

The content ratio of the metal boride can be obtained as follows. First, mapping images of the metal elements and the boron elements are obtained using AES. Sites where the metal element and the boron element overlap are extracted by image processing and specified as metal boride particles. Next, the area occupied by the metal boride particles is calculated by image analysis to obtain an area ratio of the metal boride particles. An average of the area ratios of the metal boride particles calculated by performing the above processing on at least three images is obtained as the content ratio of the metal boride in the cBN sintered body. Preferably, the observation region used in the image processing is, for example, a visual field region of 8.0 μm×8.0 μm.

In a case where a maximum X-ray diffraction peak intensity of the {001} plane of a metal boride having a hexagonal structure in the metal boride (B) containing at least one of Nb, Ta, Cr, Mo, and W and containing no Ti is represented by $I_{hex}$, and an X-ray diffraction peak intensity of the {111} plane of the cBN particles is represented by $I_{cBN}$, $0.04 \leq I_{hex}/I_{cBN} \leq 0.20$ is preferably satisfied. The X-ray diffraction peak intensity is measured using Cu-Kα rays.

In a case where, in the metal boride (B) containing the metal element but no Ti, the metal boride having a hexagonal structure is particularly dispersed in the binder phase, the reaction between the cBN particles and the binder phase is promoted. On the other hand, in a case where $I_{hex}/I_{cBN}$ is less than 0.04, the amount of the metal boride (B) containing the metal element but no Ti is insufficient, and it is not possible to obtain a sufficient reaction promotion effect between the cBN particles and the binder phase. In a case where $I_{hex}/I_{cBN}$ is greater than 0.20, cBN excessively reacts with the binder phase and the decomposition of cBN proceeds, so that a relatively excessive amount of the metal boride is present with respect to cBN and the cBN sintered body cannot obtain a strength and toughness.

3. Content Ratio of cBN Particles

In the present invention, the content ratio of the cBN particles in the cBN sintered body is not particularly limited, and is preferably 40 to 80 vol % of the whole cBN sintered body. In a case where the content ratio of the cBN particles is less than 40 vol %, the amount of hard substances in the sintered body is small, and the chipping resistance may be reduced in a case where the sintered body is used as a tool. On the other hand, in a case where the content ratio of the cBN particles is greater than 80 vol %, voids where cracks start are generated in the sintered body, and the chipping resistance may be reduced. Therefore, in order to further securely exhibit the effects of the present invention, the content ratio of the cBN particles in the cBN sintered body is preferably within a range of 40 to 80 vol %.

Assuming that the content ratio of all the cBN particles is 100 vol %, it is preferable that the content ratio of the cBN particles having an average particle diameter of less than 2 μm is 5 to 40 vol %, and the content ratio of the cBN particles having an average particle diameter of 2 μm or greater and less than 8 μm is 60 to 95 vol %.

The reasons why the content ratio of the cBN particles having an average particle diameter of less than 2 μm is adjusted within the above range are as follows: in a case where the content ratio is less than 5 vol %, the crack propagation resistance due to the dispersion of fine cBN particles is not sufficient, and the chipping resistance is reduced, and in a case where the content ratio is greater than 40 vol %, the amount of coarse cBN particles is insufficient, and the wear resistance is reduced. In addition, the reasons why the content ratio of the cBN particles having an average particle diameter of 2 μm or greater and less than 8 μm is adjusted within the above range are as follows: in a case where the content ratio is less than 60 vol %, the amount of coarse cBN particles is insufficient, and the wear resistance is reduced, and in a case where the content ratio is greater than 95 vol %, the dispersion action of fine cBN particles is not sufficient, and the chipping resistance is reduced.

The average particle diameter and the content ratio of the cBN particles can be obtained as follows.

(1) Average Particle Diameter

A cross-sectional structure of the cBN sintered body is observed with a scanning electron microscope (hereinafter, referred to as SEM), and a secondary electron image is obtained. In the obtained image, parts corresponding to the cBN particles are extracted by image processing, and an average particle diameter is calculated based on the maximum lengths of the respective particles obtained by image analysis.

In extracting the parts corresponding to the cBN particles in the image by image processing, in order to clearly determine the cBN particles and the binder phase, the image is displayed in 256-gradation monochrome with 0 as black and 255 as white, and binarization processing is performed using the image of the pixel value in which the ratio of the pixel value of the part corresponding to the cBN particle to the pixel value of the part corresponding to the binder phase is 2 or more so that the cBN particles are black.

For example, a region of 0.5 μm×0.5 μm is set as a region for obtaining the pixel values of the part corresponding to the cBN particle and the part corresponding to the binder phase, and an average obtained from three different regions at least in the same image is preferably defined as contrast of each part.

After the binarization processing, by using processing for separating parts where the cBN particles are thought to be in contact with each other, for example, watershed as one image processing method, the cBN particles thought to be in contact with each other were separated.

The part corresponding to the cBN particle (black part) in the image obtained after the binarization processing is subjected to particle analysis, and the maximum length obtained is defined as a diameter of each particle. As the particle analysis for obtaining the maximum length, the value of a larger one of the two lengths obtained by calculating the Feret's diameter for one cBN particle is defined as the maximum length, and the value thereof is defined as the diameter of each particle. The volume obtained by calculation on the assumption that the particle is an ideal sphere having the above diameter is defined as the volume of each particle, and the cumulative volume is obtained. Based on the cumulative volume, a graph is drawn with the volume percentage [%] as a vertical axis and the diameter [μm] as a horizontal axis. The diameter at which the volume percentage is 50% is defined as the average particle diameter of the cBN particles, and an average of the average particle diameters obtained by performing the above processing on three observation regions is defined as the average particle diameter [μm] of cBN. In a case where the particle analysis is performed, the length (μm) per pixel is set using the scale value known in advance by SEM.

(2) Content Ratio

Regarding the content ratio of the cBN particles in the cBN sintered body, a cross-sectional structure of the cBN sintered body is observed by SEM, parts corresponding to the cBN particles in the obtained secondary electron image are extracted by image processing, the area occupied by the cBN particles is calculated by image analysis to obtain the ratio of the cBN particles in one image and the particle size distribution, and an average of the values obtained by performing the processing on at least three images is obtained as the content ratio of the cBN particles. The image processing for extracting the parts corresponding to the cBN particles in the image is performed according to the same procedures as those for obtaining an image after the binarization processing of the average particle diameter of the cBN particles.

4. Manufacturing Method

An example of a manufacturing method according to the present invention will be shown below.

(1) Preparation of Raw Material Powders of Components Constituting Binder Phase As raw material powders constituting the binder phase, a powder of at least one of an Nb boride, a Ta boride, a Cr boride, a Mo boride, and a W boride, a powder of a Ti boride (hereinafter, these borides will be collectively referred to as metal boride), and a powder of a main raw material of the binder phase are prepared. In order to prepare a raw material powder of the metal boride pulverized to a desired particle diameter, for example, a container lined with cemented carbide is filled with the powder together with cemented carbide balls and acetone, and covered with a lid, and then the materials in the container are pulverized by a ball mill. Then, the resulting material is classified using a centrifuge, and thus a raw material powder of the metal boride with an average particle diameter of 20 to 300 nm is obtained, assuming that the average particle diameter of the raw material powder of the metal boride pulverized is a median diameter D50 in a case where the vertical axis represents the volume percentage and the horizontal axis represents the particle diameter. In addition, a binder phase forming raw material powder (for example, TiN powder, TiC powder, TiCN powder, and TiAl$_3$ powder) which has been known is prepared as the powder of the main raw material of the binder phase.

(2) Pulverization and Mixing

For example, a container lined with cemented carbide is filled with the above raw material powders together with cemented carbide balls and acetone, and covered with a lid, and then the materials in the container are pulverized and mixed by a ball mill.

Then, a cBN powder having an average particle diameter of 0.2 to 8.0 μm functioning as a hard phase is added so that the content ratio of cBN particles after sintering reaches a predetermined vol %, and ball mill mixing is further performed.

(3) Forming and Sintering

The obtained sintered body raw material powder is formed at a predetermined pressure to produce a compact. The compact is pre-sintered at 1,000° C. under vacuum, and then charged into an ultra-high pressure sintering device and sintered at a pressure: 4 to 6 GPa and a temperature: a predetermined temperature within a range of 1,200° C. to 1,600° C. to produce a cBN sintered body according to the present invention.

5. CBN Tool

A cutting tool provided with a cBN-based ultra-high pressure sintered body having the cBN sintered body according to the present invention produced as above and having excellent toughness as a tool base has excellent chipping resistance and chipping resistance, and exhibits excellent wear resistance over long term use.

EXAMPLES

In the manufacturing of cBN sintered bodies of examples, a powder of at least one of a Ta boride, a Cr boride, an Nb boride, a Mo boride, and a W boride and a powder of a Ti boride were prepared as raw material powders for constituting a binder phase, and pulverized by a ball mill to control the particle diameter, and then the pulverized material was classified using a centrifugal separation method to prepare a raw material powder of each metal boride whose particle diameter was within a desired range.

That is, a container lined with cemented carbide was filled with the raw material powder of each metal boride together with cemented carbide balls and acetone, and covered with a lid, the materials in the container were pulverized using a ball mill, and then the mixed slurry was dried and classified using a centrifuge, whereby a raw material powder of each metal boride having an average particle diameter of 20 to 300 nm was obtained.

The raw material powder of each metal boride prepared in advance as described above, and a TiN powder, a TiC powder, a TiCN powder, and a TiAl$_3$ powder having an average particle diameter of 0.02 μm to 0.5 μm were prepared. Some raw material powders for constituting a binder phase, selected from the above raw material powders, and a cBN powder as a raw material for a hard phase were blended, wet-mixed, and dried. Table 1 shows vol % of the blending compositions of the respective raw material powders, and Table 2 shows that which blending was used as a binder phase raw material other than boride raw materials of invention sintered bodies and comparative example sintered bodies.

Next, the obtained sintered body raw material powder was press-formed at a forming pressure of 1 MPa to have a size of diameter: 50 mm×thickness: 1.5 mm. The resulting compact was pre-sintered by being kept at a predetermined temperature within a range of 1,000° C. in a vacuum atmosphere at a pressure of 1 Pa or less, and then charged into an ultra-high pressure sintering device and sintered at a pressure: 5 GPa and a temperature: 1,200° C. to 1,600° C. shown in Table 3 to produce cBN sintered bodies 1 to 9 of the present invention (referred to as invention sintered bodies 1 to 9) shown in Table 4.

For comparison with cases where a ratio of $V_b N_a$ or $I_{hex}/I_{cBN}$ was out of the range specified in the present invention, a binder phase raw material other than the boride raw materials shown in Table 2 was used and sintered at a temperature shown in Table 3. The amount of each metal boride added and the ultra-high pressure sintering temperature were changed to produce cBN sintered bodies of comparative examples (hereinafter, referred to as comparative example sintered bodies) 1' to 6' shown in Table 4.

TABLE 1

| Type | | Blending Composition (vol %) | | | |
|---|---|---|---|---|---|
| | | TiN | TiCN | TiC | TiAl$_3$ |
| Binder Phase Raw Material | a | 70 | — | — | 30 |
| Other Than Boride Raw | b | — | 70 | — | 30 |
| Materials for Present Invention | c | — | — | 70 | 30 |

(Note)
The symbol indicates that the component is not contained.

TABLE 2

| Type | | Composition of Binder Phase Raw Material Other Than Boride Raw Materials |
|---|---|---|
| Invention Sintered Body | 1 | c |
| | 2 | b |
| | 3 | a |
| | 4 | a |
| | 5 | b |
| | 6 | a |
| | 7 | b |
| | 8 | c |
| | 9 | a |
| Comparative Example Sintered Body | 1' | a |
| | 2' | b |
| | 3' | c |
| | 4' | c |
| | 5' | b |
| | 6' | a |

TABLE 3

| Type | | Sintering Temperature (° C.) |
|---|---|---|
| Invention Sintered Body | 1 | 1,200 |
| | 2 | 1,400 |
| | 3 | 1,400 |
| | 4 | 1,400 |
| | 5 | 1,400 |
| | 6 | 1,200 |
| | 7 | 1,600 |
| | 8 | 1,600 |
| | 9 | 1,600 |
| Comparative Example Sintered Body | 1' | 1,600 |
| | 2' | 1,200 |
| | 3' | 1,200 |
| | 4' | 1,200 |
| | 5' | 1,200 |
| | 6' | 1,400 |

TABLE 4

| Type | | Metal Boride in Binder Phase | | | | | | | | cBN Particles | | |
|---|---|---|---|---|---|---|---|---|---|---|---|---|
| | | Average Particle Diameter (nm) | Content Ratio of Metal Boride (vol %) | Metal Component of Metal Boride Other Than Ti | $V_a$ (vol %) | $V_b$ (vol %) | $V_b/V_a$ | $I_{hex}$ | $I_{cBN}$ | $I_{hex}/I_{cBN}$ | Total Content (vol %) | Content Ratio of Particles Having Size of Less Than 2 μm (vol %) | Content Ratio of Particles Having Size of 2 μm or greater and less than 8 μm (vol %) |
| Invention Sintered Body | 1 | 65 | 1.0 | Nb | 0.5 | 0.5 | 1.0 | 160 | 3966 | 0.04 | 83 | 0 | 100 |
| | 2 | 213 | 1.9 | Cr | 1.3 | 0.6 | 0.5 | 242 | 3718 | 0.07 | 72 | 20 | 80 |
| | 3 | 87 | 0.9 | Ta | 0.8 | 0.2 | 0.3 | 276 | 3563 | 0.08 | 75 | 10 | 90 |
| | 4 | 252 | 2.0 | Ta | 1.1 | 0.8 | 0.7 | 612 | 3694 | 0.17 | 71 | 18 | 82 |
| | 5 | 92 | 1.1 | Cr, Mo | 0.6 | 0.5 | 0.8 | 187 | 3740 | 0.05 | 78 | 10 | 90 |
| | 6 | 99 | 1.6 | Mo | 1.0 | 0.5 | 0.5 | 430 | 3700 | 0.12 | 75 | 20 | 80 |
| | 7 | 131 | 2.9 | Mo | 2.3 | 0.6 | 0.3 | 134 | 895 | 0.15 | 45 | 30 | 70 |
| | 8 | 103 | 1.7 | W | 1.2 | 0.5 | 0.4 | 149 | 3720 | 0.04 | 71 | 10 | 90 |
| | 9 | 90 | 3.9 | Ta | 2.2 | 1.7 | 0.8 | 318 | 2900 | 0.11 | 70 | 30 | 70 |
| Comparative Example Sintered Body | 1' | 53 | 0.7 | Nb | 0.8 | 0.0 | 0.0 | 40 | 3777 | 0.01 | 75 | 4 | 96 |
| | 2' | 380 | 3.4 | Cr | 1.6 | 1.9 | 1.2 | 341 | 726 | 0.47 | 39 | 100 | 0 |
| | 3' | 362 | 1.7 | Nb, Cr | 0.9 | 0.8 | 0.9 | 80 | 3840 | 0.02 | 82 | 50 | 50 |
| | 4' | 329 | 3.5 | Ta, W | 1.4 | 2.1 | 1.5 | 226 | 690 | 0.33 | 38 | 100 | 0 |
| | 5' | 423 | 7.2 | Mo | 2.7 | 4.5 | 1.7 | 460 | 923 | 0.5 | 45 | 100 | 0 |
| | 6' | — | 0.0 | — | 0.0 | — | — | — | 3797 | — | 73 | 5 | 95 |

(Note 1)
The symbol "—" indicates that the component is not contained.

(Note 2)
The size of the cBN particles is an average particle diameter.

In Table 4, the case where a plurality of metal elements are described as the metal components of the metal boride other than Ti indicates that there is a composite boride having the metal elements described in the table.

Next, the invention sintered bodies 1 to 9 and the comparative example sintered bodies 1' to 6' were cut into a predetermined size by a wire electric discharge machine, and test pieces were obtained. A WC-based cemented carbide insert body having a composition of Co: 5 mass %, TaC: 5 mass %, and WC: remainder and having an insert shape of ISO standard CNGA120408 was prepared. The test piece was brazed to a brazing portion (corner portion) of the WC-based cemented carbide insert body using a brazing material. As the brazing material, a brazing material of an Ag alloy having a composition of Cu: 26 mass %, Ti: 5 mass %, and Ag: remainder was used. Polishing and horning were performed on the upper and lower surfaces and on the outer periphery of the obtained insert, and thus cBN-based ultra-high pressure sintered body cutting tools of the present invention (referred to as invention tools) 1 to 9 and cBN-based ultra-high pressure sintered body cutting tools of comparative examples (referred to as comparative example tools) 1' to 6' having an insert shape of ISO standard CNGA120408 were manufactured.

Next, the invention tools 1 to 9 and the comparative example tools 1' to 6' were cut under the following cutting conditions, and tool lives thereof (number of interruptions) until defects occurred were measured.

Dry Cutting Conditions

Work Material: Round bar with equally spaced vertical grooves in length direction of carburized and tempered steel (JIS•SCR420, hardness: HRC 58 to 62)
Cutting Speed: 250 m/min,
Cutting depth: 0.15 mm,
Feeding: 0.1 mm/rev The number of interruptions until chipping or defects occurred in the cutting edge of each tool was defined as a tool life, and the cutting edge was observed every 2,000 times of interruptions to confirm the presence or absence of defects or chipping of the cutting edge. Table 5 shows the results of the cutting test.

TABLE 5

| Type | | Tool Life (Number of Interruptions) |
|---|---|---|
| Invention Tool | 1 | 35,000 |
| | 2 | 55,000 |
| | 3 | 92,000 |
| | 4 | 88,000 |
| | 5 | 42,000 |
| | 6 | 68,000 |
| | 7 | 47,000 |
| | 8 | 46,000 |
| | 9 | 94,000 |
| Comparative Example Tool | 1' | 15,000 |
| | 2' | 9,000 |
| | 3' | 10,000 |
| | 4' | 6,000 |
| | 5' | 10,000 |
| | 6' | 13,000 |

As shown by the results shown in Table 5, the invention tools 1 to 9 had a dramatically increased tool life and improved toughness without the occurrence of sudden cutting edge defects or chipping. On the other hand, the comparative example tools 1' to 6' each provided with the cBN-based ultra-high pressure sintered body not satisfying one or more of the requirements of the present invention had a short tool life.

INDUSTRIAL APPLICABILITY

A cBN sintered body having excellent toughness according to the present invention has high toughness, and thus in a case where the cBN sintered body is used as a tool base of a CBN tool, it exhibits excellent chipping resistance over long term use without the occurrence of defects or breakage, and has an increased tool life. Therefore, the present invention can sufficiently and satisfactorily meet increasing the performance of a cutting device, and labor saving, energy saving, and cost saving in the cutting, and thus can be industrially used.

What is claimed is:

1. A cBN-based ultra-high pressure sintered body comprising:
    cBN particles; and
    a binder phase,
    wherein the binder phase contains at least one of a nitride or oxide of Al or a nitride, carbide, or carbonitride of Ti, and includes a metal boride having an average particle diameter of 20 to 300 nm, and the metal boride is dispersed in an amount of 0.1 to 5.0 vol % with respect to the whole cBN sintered body,
    the metal boride includes a metal boride (B) containing at least one of Nb, Ta, Cr, Mo, and W as a metal component and containing no Ti and a metal boride (A) containing only Ti as a metal component,
    in a case where a ratio (vol %) of the metal boride (A) containing only Ti as a metal component is represented by $V_a$ and a ratio (vol %) of the metal boride (B) containing at least one of Nb, Ta, Cr, Mo, and W as a metal component and containing no Ti is represented by $V_b$, a ratio of $V_b/V_a$ is 0.1 to 1.0, and
    a content ratio of the cBN particles in the cBN-based ultra-high pressure sintered body is 40 to 80 vol %, and assuming that a content ratio of all the cBN particles is 100 vol %, a content ratio of the cBN particles having an average particle diameter of less than 2 μm is 5 to 40 vol %, and a content ratio of the cBN particles having an average particle diameter of 2 μm or greater and less than 8 μm is 60 to 95 vol %.

2. The cBN-based ultra-high pressure sintered body according to claim 1,
    wherein in a case where a maximum X-ray diffraction peak intensity of a {001} plane of a metal boride having a hexagonal structure in the metal boride containing at least one of Nb, Ta, Cr, Mo, and W as a metal component and containing no Ti is represented by $I_{hex}$, and an X-ray diffraction peak intensity of a {111} plane of the cBN particles is represented by $I_{cBN}$, $0.04 \leq I_{hex}/I_{cBN} \leq 0.20$ is satisfied.

3. A cutting tool comprising:
    the CBN-based ultra-high pressure sintered body according to claim 1.

4. A cBN-based ultra-high pressure sintered body comprising:
    cBN particles; and
    a binder phase,
    wherein the binder phase contains at least one of a nitride or oxide of Al or a nitride, carbide, or carbonitride of Ti, and includes a metal boride having an average particle diameter of 20 to 300 nm, and the metal boride is dispersed in an amount of 0.1 to 5.0 vol % with respect to the whole cBN sintered body, the metal boride includes a metal boride (B) containing at least one of Nb, Ta, Cr, Mo, and W as a metal component and containing no Ti and a metal boride (A) containing only Ti as a metal component, in a case where a ratio (vol %) of the metal boride (A) containing only Ti as a metal component is represented by $V_a$ and a ratio (vol %) of the metal boride (B) containing at least one of Nb, Ta, Cr, Mo, and W as a metal component and containing no Ti is represented by $V_b$, a ratio of $V_b/V_a$ is 0.1 to 0.8, and in a case where a maximum X-ray diffraction peak intensity of a {001} plane of a metal boride having a hexagonal structure in the metal boride containing at least one of Nb, Ta, Cr, Mo, and W as a metal component and containing no Ti is represented by $I_{hex}$, and an X-ray diffraction peak intensity of a {111} plane of the cBN particles is represented by $I_{cBN}$, $0.04 \leq I_{hex}/I_{cBN} \leq 0.20$ is satisfied.

5. A cutting tool comprising:

the cBN-based ultra-high pressure sintered body according to claim 4.

* * * * *